United States Patent [19]
Voss

[11] Patent Number: 5,180,443
[45] Date of Patent: Jan. 19, 1993

[54] PRESSURE-RELIEF VALVE WITH STEPPED OR DOUBLE PISTON

[75] Inventor: Richard Voss, Schwerte, Fed. Rep. of Germany

[73] Assignee: Richard Voss Grubenausbau GmbH, Schwerte, Fed. Rep. of Germany

[21] Appl. No.: 671,918

[22] PCT Filed: May 10, 1990

[86] PCT No.: PCT/DE90/00332
§ 371 Date: Mar. 19, 1991
§ 102(e) Date: Mar. 19, 1991

[87] PCT Pub. No.: WO90/14500
PCT Pub. Date: Nov. 29, 1990

[30] Foreign Application Priority Data

May 19, 1989 [DE] Fed. Rep. of Germany ....... 3916260
Jul. 12, 1989 [DE] Fed. Rep. of Germany ....... 3922894
Sep. 1, 1989 [DE] Fed. Rep. of Germany ....... 3929094

[51] Int. Cl.⁵ .............................. F16K 17/04
[52] U.S. Cl. .................... 137/494; 137/538
[58] Field of Search .................. 137/494, 538

[56] References Cited

U.S. PATENT DOCUMENTS

3,763,882 10/1973 Shoop ................................. 137/494
4,552,172 11/1985 Kreger ........................... 137/538 X
4,660,595 4/1987 Kuster ................................. 137/494

*Primary Examiner*—Robert G. Nilson
*Attorney, Agent, or Firm*—Herbert Dubno

[57] ABSTRACT

A pressure-limiting valve having high flow rates, especially for uses as a safety valve with mine props and the like, uses a tubular main-valve member whose interior communiciates with the valve inlet and has lateral bores opening into the valve outlet when the bores are shifted past a sealing ring in the valve housing. A pilot-valve body is received in the tubular valve and the valve spring bears upon the tubular valve. The main valve is shifted by differential pressure.

8 Claims, 4 Drawing Sheets

FIG. 4

# PRESSURE-RELIEF VALVE WITH STEPPED OR DOUBLE PISTON

CROSS REFERENCE TO RELATED APPLICATION

This application is a national phase of PCT/DE90/00332 filed May 10, 1990 based upon German national applications P39 22 894.0 filed July 12, 1989, P39 29 094.8 filed Sept. 1, 1989 and P39 16 260.5 filed May 19, 1989 under the International Convention.

1. Field of the Invention

The invention relates to a pressure-relief valve for the protection of hydraulic units, particularly the hydraulic face support systems in underground mining and tunnel construction, against sudden overload due to rock pressure or similar causes, with a valve piston arranged to slide longitudinally in the valve housing against the force of a spring and with an inlet opening on the one side of the piston provided with blind bore and with radial bores at the extremity, as well as with outlet holes on the other side of the valve piston, whereby the valve piston is sealed by means of an O-shaped annular seal over which the radial bores can travel.

2. Background of the Invention

Such pressure-relief valves, also known as safety valves, are used where a hydraulic system, particularly a system of hydraulic struts (props) in underground coal mining, can be damaged by excessive pressure. These hydraulic struts are arranged either as individual struts or integrated in a shield-type support. Because of the constant danger, there are official requirements for providing pressure-relief valves not only for such shield-type support systems, but also for the individual hydraulic struts, in order to prevent permanent damage or even destruction endangering the miners, in cases of overload. DE-OS 28 30 891 describes a pressure-relief valve wherein excessive pressure in the hydraulic system is reduced by means of a valve spring braced between the locking screw and the valve piston. On the valve spring cap or the valve spring retainer a conically or spherically shaped valve-closing body is provided which is lifted off the valve seat in case of overload. On the piston a damping cylinder is provided, which limits the flow passage opening. However, such valves do not afford the locking safety required for the use as pressure-relief valves or safety valves in mining. Furthermore an accurate positioning particularly of the spring is very difficult, which means that all of the requirements for a safe response of such a mining safety valve are not fulfilled.

DE-OS 33 14 837 described another pressure-relief valve wherein the valve spring is arranged in the valve housing so that it presses on the valve spring cap and thereby on the valve piston and this way influences the opening of the valve corresponding to the setting. The valve piston is slidably guided on a piston-pin bore formed in the guide, whereby the necessary sealing is provided by an O-shaped annular seal located in a groove. In order to insure reliable operation and a timely response of the valve while ensuring a long life for the sealing rings, the latter have to be completely overridden by the radial bores of the piston. Through the radial bores, the blind hole provided in the valve piston and connected with the piston-pin bore can be reached, so that when the O-shaped sealing rings are overridden the pressure medium can exit the hydraulic unit to be protected. The drawback of these known pressure-relief valves are the low throughflow values of 40 to 60 (maximum 100) liters per minute. This is not satisfactory for the required safety and quick response of such valves. Besides, it is disadvantageous that the valve springs involved have to use wire of considerable strength and have considerable coil diameter in order to counteract the pressures; the spring size requires correspondingly large overall valve dimensions. The larger the throughflow, the bigger the valve springs, and thereby the entire valve housing, have to be. In this case, particularly in underground mining, it is not possible to use very large valves, not to mention that the required cross sections for the evacuation of the pressure medium would not be available.

OBJECT OF THE INVENTION

It is therefore the object of the present invention to provide a pressure-relief valve with large throughflow (over 1000 liter per minute), but having small overall dimensions (valve spring, spring space) and workable closing values.

SUMMARY OF THE INVENTION

According to the invention, this object is achieved in that the valve piston is designed as a continuous tube shell with a large discharge surface having an attachment with a reduced diameter serving as a control piston and also sealing rings on both sides of the outlet opening designed as a cross bore, thereby defining two separate chambers subject to the equal pressure inside and above the valve piston and that the control piston rests against the spring cap loaded by the valve spring.

Based on this integral construction, it is possible to design the control piston with such a small diameter, that first of all favorably differentiated surfaces result, and in addition the valve spring assigned to this control piston can also have very favorable values, i.e. small dimensions. Based on a valve spring with smaller wire thickness and corresponding spring force a compact valve housing can be used, into which the valve spring can be integrated without difficulty. Moreover, the control piston becomes the pressure-relief valve at the same time, which in itself already allows for a throughflow capacity of roughly 400 liter per minute. On top of that, the actual valve piston due to its favorable dimensions, i.e. its large discharge surface, can allow for a considerably throughflow capacity of 2000 liter per minute and more, so that altogether a valve is created which will safely afford a throughflow of 1000 liter per minute. Besides, due to the adroit discharge of the pressure medium from the area of the control piston, an improvement of the closing value is obtained. A further improvement of the closing values is obtained by using such sealing rings which can have reduced friction coefficient. By creating the chambers on both sides of the valve piston and their connection—as a result both being subjected to the same pressure—a pressure balance is created, so that the control piston exclusively is responsible for the positioning of the spring.

According to a feature embodiment of the invention, the spring space is separated by a partitioning wall from the inlet opening, which underneath the partition changes over to the cross bore serving as an outlet opening. The valve piston forms a structural unit with the control piston equipped with an inner blind bore starting out from the blind bore and with radial bores and which is slidably guided in a bore with an O-shaped sealing ring made in the partitioning wall. The chamber are connected over passage bores made in the lid of the valve piston. In a construction of this type, it is possible to rely on stable movable parts and on a design of the control piston such as found in proven valves. The stepped piston according to the invention provides the differential areas which are required for the sought low closing values.

A favorable design is achieved by centrally introducing the piston in the lid and by arranging the throughflow passages around it in a circle. This way the compact construction of the valve piston and control piston is preserved, since the control piston can be made for instance by turning (machining) off the valve piston in its upper region. The throughflow passages make sure that the valve piston maintains its balance under normal pressure circumstances, so that the cross bore is effectively closed. Only when the pressure increases can the small control piston fulfill its function, by pushing the valve spring retainer against the force of the valve spring, thereby also simultaneously moving the valve piston, so that pressure medium can exit the valve at the same time through the area of the valve piston and of the control piston. Thereby the necessary relief of the hydraulic unit is achieved, and namely as long as it takes to eliminate the excessive pressure, whereafter the pressure-relief valve closes immediately. The quick and accurate response is insured due to the fact that the control piston has an outer annular groove in the area of its onset.

In order to reduce and moderate the discharge resistance it is provided that the cross bores start out from an annular channel and run outwardly inclined. This way, a rerouting of the flow of pressure medium is reduced to a minimum.

The already mentioned large throughflow quantities are reached by adjusting the diameters of the valve piston and control piston, whereby a favorable embodiment is one in which valve piston has an external radius of 25 mm while the external radius of the control piston is 10 mm. Further it is proposed to provide the valve piston with 12 radial bores with a diameter of 5 mm and the control piston with 6 radial bores having 2.5 mm., so that the corresponding amounts of pressure medium can be safely evacuated.

Surprisingly favorable closing values are achieved with the pressure-relief valve of the invention when the sealing rings, optionally also the O-shaped annular seal, are made of Teflon plastic material TFM 1600 and have a rectangular cross section. Such sealing rings, which are not very flexible, still insure an effective sealing, have extremely long operational lives and permit the achievement of the already mentioned favorable closing values, because the friction between sealing rings and valve piston is reduced to a minimum. This is particularly the case when the sealing rings have a rectangular cross section. Such sealing rings lead to a good surface sealing, without significant reduction of the movements of the valve piston due to the generated friction. In this way it is possible to use continuous tubular shells with very large diameters for valve pistons, which contributes to an increase of the admissible and possible throughflowing amounts. In order to mount the teflon sealing rings quickly and accurately it is proposed that the sealing rings be arranged in upwardly or downwardly opening sealing groves and be mounted via a plug-in socket or a guide screw, which at the same time can constitute the partition. The plug-in socket is advantageously exposed to the pressure of the pressure medium and secured in the connection piece, without requiring a locking or bolting. By contrast, the guide screw is screwed in from the spring space and thereby effectively fastens the upper sealing ring, which will not be removed from its position in the assigned annular groove during operation.

The control piston can cut across the partitioning wall of the valve piston shaped like a tubular shell and can be indented therewith in the opening direction of the valve as a stepped indented piston with differential surfaces. Here, the differential surfaces in the transition area between the control piston and the valve piston can be preselected, whereby due to the indentation of the valve piston and the control piston it is insured that both perform the same respective movements, or that the control piston respectively entrains the valve piston and forces it into the respective position. The differential surfaces are particularly predetermined by the fact that valve piston continues with a kind of ram, whereby the pressure medium usually enters the blind bore of the valve piston, than further into the inner blind bore of the control piston and from there over the radial bores into the spring space, so that here too on both sides of the cross bores the same pressure is built up. The differential surface, i.e. the pressure surface is thereby determined only by the already mentioned ram, or rather guide attachment. Irregular movements of the control piston and valve piston are precluded by the fact that the control piston is supported in the partitioning wall of the valve cylinder and guided in the adjusting screw.

In another embodiment, the valve piston is formed as a tubular shell with closed partition wall the chambers can be built like annular channels and mutually connected through housing bores running parallelly to the valve axis. The diameter of the tubular can be reduced in the direction of the opening. Here it is not necessary to displace large amounts of pressure medium, but only the amounts present in the annular channels, whereby it is still possible for the valve to respond quickly and accurately with favorable spring dimensions. The reduced wire diameters of the valve spring permit favorable overall dimensions, whereby it is insured by this particular construction that the additional channels can be laid out so that the dimensions of the valve do not have to suffer. The annular channels and the connecting housing bores are so set up that neither the diameter or width of the pressure-relief valve nor the length of the valve housing have to be changed.

A connection to the prop in the case of individual prop valves is easily and quickly done, since the connection piece has an external threaded connection with the inlet opening.

Also in such embodiments the sealing with respect to the connected hydraulic component can be done simply, by providing the connection piece on its free surface with a circular groove and an external O-shaped annular seal.

Instead of the housing bypass bores and the annular channels it is also possible to have a throttle bore in the partition wall and the diameter reduction in the transition area between the partition and the spring space can be effected on the tubular shell. Based on these special features it is possible to make available large bores for the passage of large amounts of pressure medium, just like in the case of the other embodiments described. Since the spring space and the antechamber are connected by a throttle bore, on both sides of the partition wall the same pressure is established. Starting from this point, when an overload occurs a quick overriding of the 0-ring respectively sealing ring by the radial bores and therewith a quick exit of the pressure medium is insured, whereby springs with a flat characteristic curve can be used, so that one can operate with relatively small and compact springs. The diameter reduction insures reliable displacement of the valve piston against the force of the valve spring showing a clearly favorable characteristic spring curve. At the same time, based on this construction the retraction of the valve piston is insured when the excessive load ceases to exist, thereby also insuring the response of the hydraulic system employed for support. The response of the valve piston is particularly insured when the diameter reduction results in a pressure-surface difference of 0.08 to 0.2 cm.

The penetration of dirt into the valve through the cross bores is prevented by providing in the external wall of the valve housing in the area of the cross bores a wide annular groove with an embedded sealing ring.

The result is as highly compact pressure-relief valve allowing larger amounts of throughflow, i.e. with a throughflow of 1000 to 3000 liter per minute, which, based on its favorable overall dimensions, can be employed practically everywhere in underground mining, as well as in other fields. This is achieved with only digit increase in manufacturing cost. The favorable overall dimensions result primarily from the fact that springs with a slowly ascending characteristic curve are used, which insure a good response of the pressure-relief valve in conditions of very low space requirements. The functioning of the valve is insured by advantageous closing values, by using correspondingly suitable sealing rings. The use of a valve piston with very large discharge surface insures the amounts of the throughflow of 1000, 2000 and more liter per minute, so that the special conditions existing in underground mining are taken into consideration.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
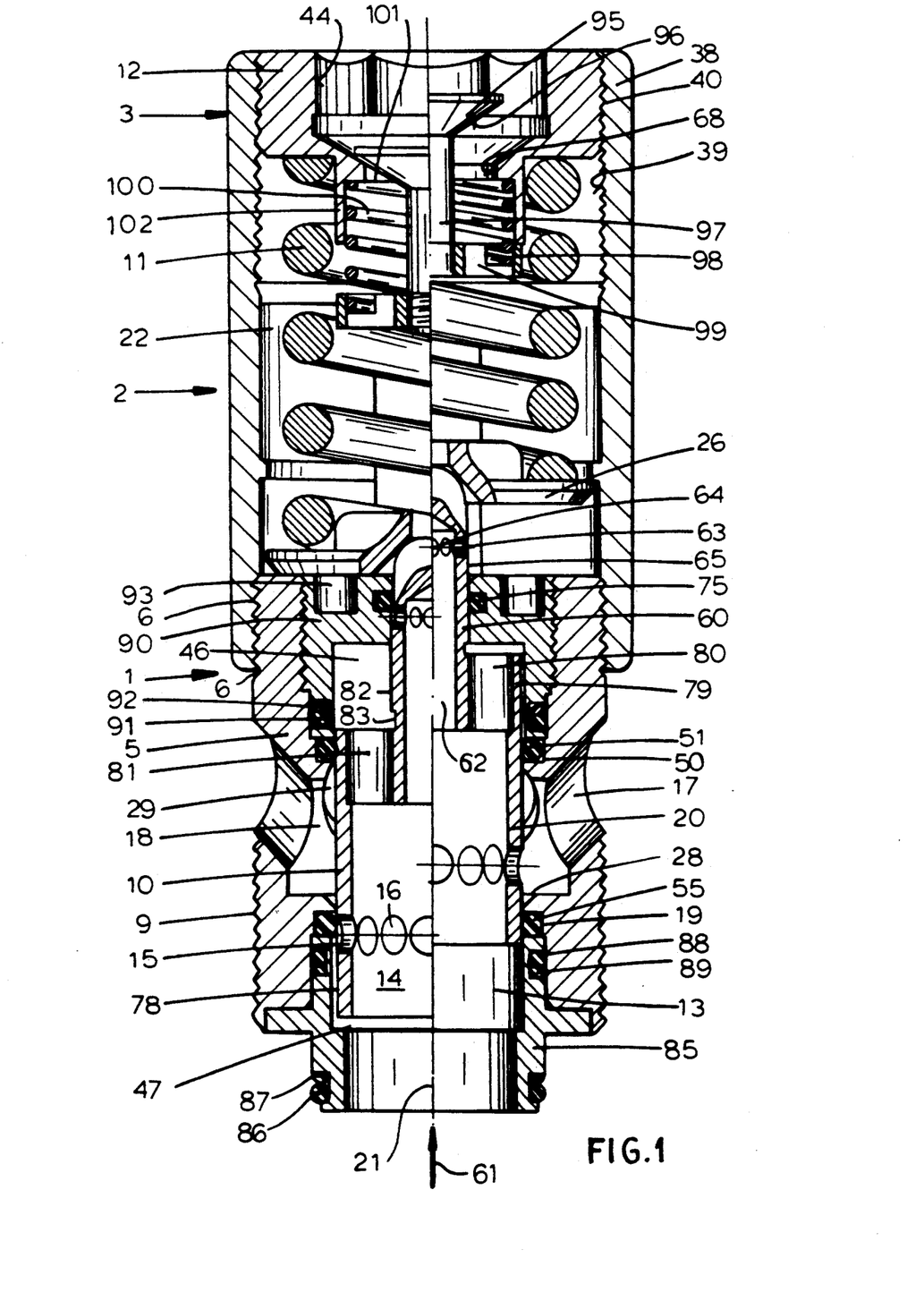
FIG. 1 is a cross-sectional view of a pressure-relief valve in longitudinal section with stepped piston, in open and closed position.

FIG. 1 shows a pressure-relief valve 1 in its two possible positions. On the right side the open position and on the left side the closed position of the pressure-relief valve 1 are shown. The valve housing 2 is shown in section, so that the individual components are recognizable.

The valve housing 2 consists of an upper portion 3 with an inner thread 4 and connection piece 5 having an external thread 6. The external thread 6 is approximately aligned with the external connection thread 9, by means of which the pressure-relief valve can be connected, i.e. screwed on to for instance a hydraulic nine prop strut.

The connection piece 5 has an internal bore which at the same time is the inlet bore 13 for the pressure medium. In this inlet bore 13 the valve piston 10 is inserted. The piston is formed as a tubular shell 20. The valve piston 10 has a blind bore 14 which continues with the radial bores 15, 16. In the closed position of the valve, the radial bores 15, 16 are separated by the sealing ring 19 from the annular channel 18 and the cross bores 17. The pressure medium entering the pressure-relief valve from the inlet bore 13 can not exit via the blind bore 14 and the radial bores 15, 16 when the valve is closed. The lower edge (28) of the cross bore 17 is located, as shown in the left portion of FIG. 1 above the radial bores 15, 16 sealed off, or separated by sealing ring 19.

The outer wall 29 of the valve piston 10 or the tubular shell 20 is smooth all the way, so that when it rides over the sealing ring 19 normal friction occurs.

On the piston valve 10 centrally and thus along the valve axis 21 a control piston 60 is formed, which is spring loaded against the opening direction 61 by the valve spring 11. The valve spring 11 rests on the one hand on the adjusting screw 12 and on the other hand on the spring cap 26, the control piston 60 resting against the latter. The valve spring 11 arranged in the spring space 22 can, in this way, efficiently load the control piston 60 so that this piston together with valve piston 10 can open only when the set spring force is surpassed. The setting of the valve spring takes place by means of the adjusting screw 12, which can be adjusted in the head portion 38 in the inner bore 39 via the thread 40. It has an inner hexagonal socket head 44 in order to simplify the adjusting operation.

The sealing of the valve piston 10 in the form of a tubular shell 20 takes place first of all, as already mentioned, via the sealing ring 19 lodged in an annular groove 55 and then also via the upper sealing ring 51 lodged in the annular groove 50. These sealing rings are made of a plastic material Teflon generating as little friction as possible.

The pressure medium entering the pressure-relief valve 1 through the inlet bore 13 flows via the blind bore 14 up to the upper end of the valve piston 10 represented by the lid 79. This lid 79 is provided with passage openings 80, 81, so that the pressure medium in the blind bore is present in chamber 47 as well as in the overlying chamber 46, and in this way is present on both sides of the valve piston 10. Thus, the valve piston 10 floats in the position shown in the left half of FIG. 1, as long as the pressure conditions set by means of the valve spring 11 are maintained.

At the same time, the pressure medium flows through the control piston 60, which has an inner blind bore 62 and terminally arranged radial bores 63, 64. It is sealed via O-ring 75, so that only when this O-ring 75 is overridden can pressure medium enter the spring space 22 via radial bores 63, 64. For this to happen, the force of the valve spring 11 has to be overcome. Since the external wall 65 of the control piston 60 is smooth and the O-ring 75 has a relatively small diameter, here too the friction forces are so small that they do not impair the closing values of the valve.

When the pressure-relief valve 1 is triggered, the pressure medium flows through the inlet opening 13, the blind bore 14 and the inner blind bore 62, as well as through the radial bores 63, 64 into the spring space 22.

In order to prevent a backflow and at the same time to increase the throughflow capacity of such a pressure-relief valve, the adjusting screw 12 has a passage opening 68, through which the pressure medium can be discharged. In the embodiment of FIG. 1, this passage opening 68 is closed by a dirt-protection valve. This dirt-protection valve consists of a sealing bolt 95 having a seat surface 96, so that—as can be seen from FIG. 1—when the sealing bolt 95 is under the effect of the force of spring 100 an effective sealing is accomplished. The bolt stem 97 extends into the spring space 22 and is equipped with a disk washer 98. The spring 100 is then tightened between this disk washer 98 and the inside 101 of the adjusting screw 12, so that the sealing bolt 95 remains in the position shown in the left side of FIG. 1 when the pressure-relief valve 1 is closed. When the pressure-relief valve 1 is triggered and the pressure medium flows into spring space 22, the sealing bolt 95 is displaced, namely against the force of spring 100. Then the pressure medium can exit through the passage bore 68. The flow of pressure medium is thereby hindered as little as possible by the disk washer 98 because it is provided with openings 99. The spring 100 itself is secured by the guide 102, so that an entanglement or mutual influence between the valve spring 11 and the spring 100 is not possible.

In the onset area 82 of the control piston 60 an external annular groove 83 is provided, which considerably improves the response of the valve during the return stroke of the valve.

The sealing rings 19, 51 rub against the outer wall 29 of the valve piston 10 in order to keep the valve sealed. When the valve piston 10 is displaced, this friction leads intentionally to an impairment, of course only a slight impairment, of the course of motion, since the sealing rings 19, 51 are made of Teflon or another similar plastic material.

The lower sealing ring 19 lodged in the annular groove 55 can be easily mounted in spite of its low flexibility, since in the inlet bore 13 plug-in socket 85 is introduced from the opening direction 61. This plug-in socket 85 is secured downwards by the O-ring 86 and the support ring 87 and upwards by the O-ring 88 and the support ring 89. The upper sealing ring 51 can be mounted in a simple way, since it is secured by the guide screw 90 which is sealed via the O-ring 91 and the support ring 92. The mounting of the guide screw 90 is facilitated due to the opening 93 which makes possible the screwing into the thread without any problems. Besides, the opening 78 of the inlet bore 13 is widened to such an extent that the plug-in socket 85 can also be introduced just as simply as the guide screw 90 can be screwed in place.

FIG. 1 shows in its right half an open pressure-relief valve 1, from which it will be clear that the pressure medium, as a result for instance of the overload in the connected hydraulic system, can now flow without impediment through the inlet bore 13 into the pressure-relief valve 1, and reach the annular channel 18 via blind bore 14, and the radial bores 15, 16. From there it is discharged the cross bores 17 from the pressure-relief valve. Based on the relatively large diameter of the valve piston 10, which has an outer radius of 25 mm and on the here-arranged 12 radial bores 15, 16 each having a diameter of 5 mm, a throughflow capacity of over 2000 liter per minute is insured. At the same time the pressure mediums streams through the control piston 60 and its inner blind bore 62 all the way through the radial bores 63, 64 into the spring space 22. From here it flows outside after the sealing bolt 95 is lifted in the area of the adjusting screw and traversing the passage opening 68. When the pressure surge is eliminated, the valve spring 11—through the sealing rings 19, 51 and the O-ring 75—presses the control piston 60 and the valve piston 10 back into their position seen in the left half of FIG. 1. At this point, the pressure-relief valve is closed again and the safety of the connected hydraulic system is insured.

Figure 2:
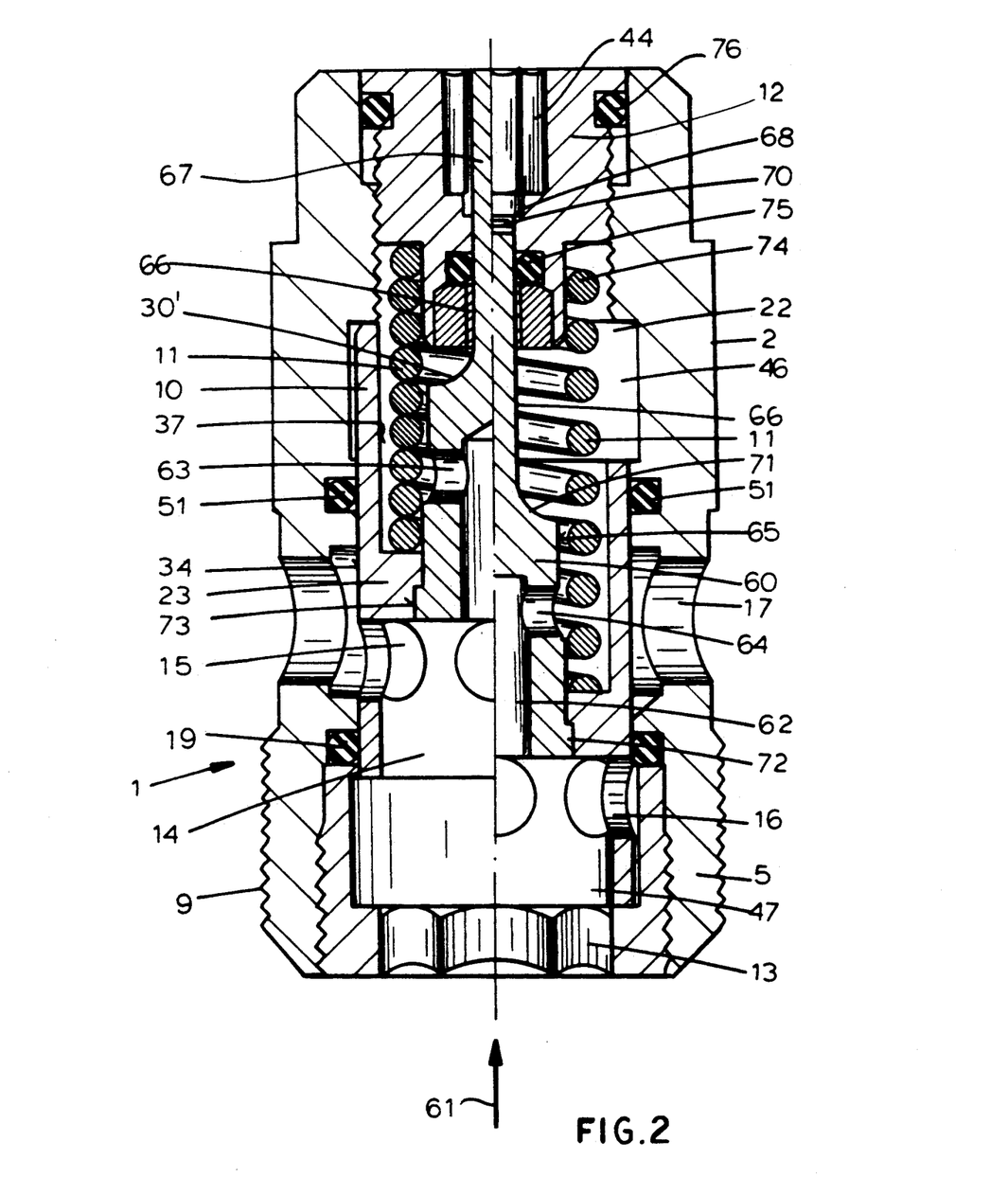
FIG. 2 is a similar view of a pressure-relief valve with a two-part piston.

In the embodiment of the pressure-relief valve as shown in FIG. 2, the valve piston 10 and the control piston 60 form again a motion unit. The control piston 60 is indented with the valve piston 10 in the opening direction 61 so that both respectively perform the same motions.

The control piston 60 is provided with an inner blind bore 62 succeeding the blind bore 14 and also with terminally arranged radial bores 63, 64, so that the pressure medium can enter the spring space 22 which in this case coincides with the upper chamber 46. Thereby, the valve piston 10 is in a state of equilibrium, since here too the same pressure conditions exist in both chamber 46 and chamber 47.

The valve spring 11 is lodged between the outer wall 65 of the control piston 60 and the inner wall 37 of the valve piston 10. The differential surface 66 is created as a result of the fact that the control piston 60 is provided with a guide extension 67 which is fixed to the inner piston forming an inner chamfer 71 and which reaches into the passage bore 68 of the adjusting screw 12. Here, the guidance is achieved by means of guide extension 67. Here too the O-ring 75 takes care of the necessary sealing. The difference in the position of the safety plate 70 which is lifted together with the control piston 60 indicates whether the pressure-relief valve 1 has responded or it is out of order. The safety plate 70 can then each time be repositioned, so that at the next use it can again indicate whether the valve operates.

The connection between the control piston 60 and the valve piston 10 is achieved by a projection 72 in the control piston and a corresponding recess 73 in the valve piston. When a corresponding fit is established it is insured that both components perform the same motion.

The O-ring 75 is secured by the retaining nut 74 screwed into a corresponding thread. On its part, the adjusting nut 12 is sealed via the O-ring 76.

Figure 3:
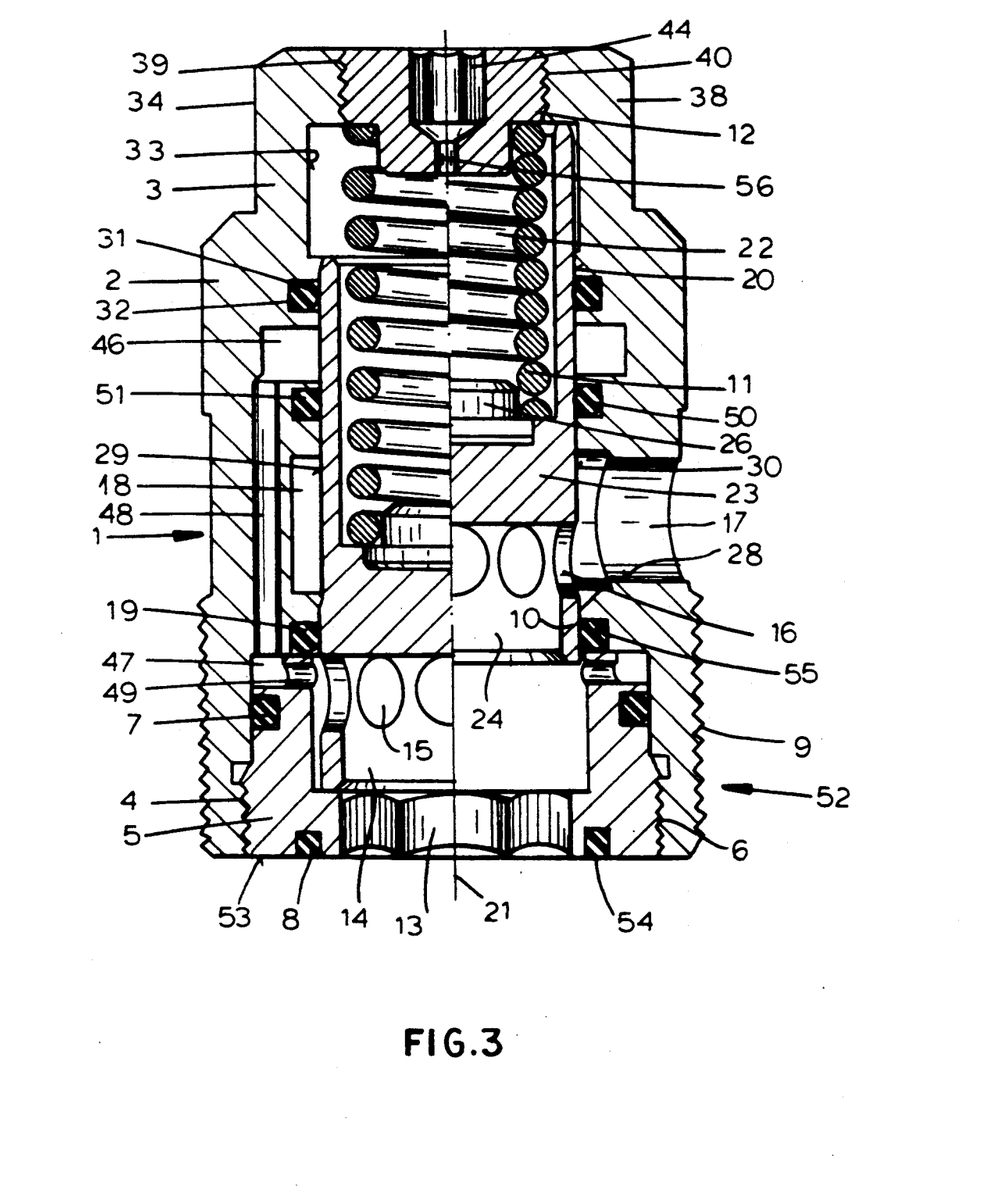
FIG. 3 is another axial section is a pressure-relief valve with a valve piston designed as a tubular shell and lateral housing bores.

Also in the embodiment shown in FIG. 3 the valve housing 2 consists of an upper part 3 with inner thread 4 and the connection piece 5 with an outer connection thread 9. The screwed connection as such is secured by O-ring 7, so that the pressure medium can not exit over this screwed connection, while the outer O-ring 8 at the lower end of the connection piece 5 insures a safe and sealed connection with the hydraulic unit to be protected.

FIG. 3 shows an embodiment wherein the spring space 22 receiving the valve spring 11 is separated by a partitioning wall 23 from the so-called antechamber 24, which means also from the chamber 47. The partitioning wall 23 runs at a right angle with respect to the valve axis 21. The partitioning wall 23 can serve at the same time as the spring cap 26. However, here a separate cap is provided, which rests loosely on the partition 23.

The outer wall 29 of the tubular shell 20 has two diameters. In the closed position of the pressure-relief valve 1, the portion with the reduced diameter 30 is located approximately in the area of the lower edge 28 of the cross bore 17.

The necessary pressure balance between the spring space 22 and the antechamber 24, i.e. intermediate space 47 and 46 is established via the two annular channels and the housing bores 48 connecting the two. At the same time, in addition to the sealing ring 19 and 51 an O-ring seal 31 is provided. The O-rings 31 are lodged in the annular groove 32. The annular channel, respectively space 47 is connected via the radial bores 49 with the blind bore 14 and the inlet bore 13. The wall of the radial bores 49 serve thereby at the same time for connecting the groove 55 wherein the sealing ring 19 is lodged.

The inner wall 33 and the outer wall 34 of the valve housing 2 are spaced apart so that a sufficiently strong wall for the valve housing is insured. In this wall, the housing bore 48 is provided which connects the two chambers 46, 47 and the annular channels. When the pressure-relief valve 1 is screwed into the hydraulic unit to be protected, the pressure medium flows via the inlet bore 13 and the blind bore 14 and the antechamber 24, as well as via the annular channel and the chamber 47 and the housing bore 48 into the annular channel, respectively chamber 46. In this way, the same pressure is established on both sides, which makes possible a correspondingly favorable selection of the wire strength for the required valve spring 11.

A displacement of the valve piston 10 when excessive pressure occurs is made possible due to the diameter reduction 30 as to the area of the outer wall 29. As already explained in the closed position of the pressure-relief valve 1, this diameter reduction 30 is located at the lower edge 28 of the bore 17, so that here a complete sealing by the sealing ring 19 is insured. With respect to the upper portion 25 the diameter reduction 30 amounts here to 25/24.7 mm.

In the adjusting screw 12 a venting bore 56 is provided, which runs axially parallel, so that the air existing in the spring space 22 can exit without any problems when the pressure-relief valve 1 is triggered. At the same time, no underpressure is generated in this area.

In the area of the connection piece 5 the valve housing 2 has on the outside a segment 52 with the outer connection thread 9. The external O-ring 8 is lodged in a circular groove 54 in the free surface 53 of the connection piece 5.

Figure 4:
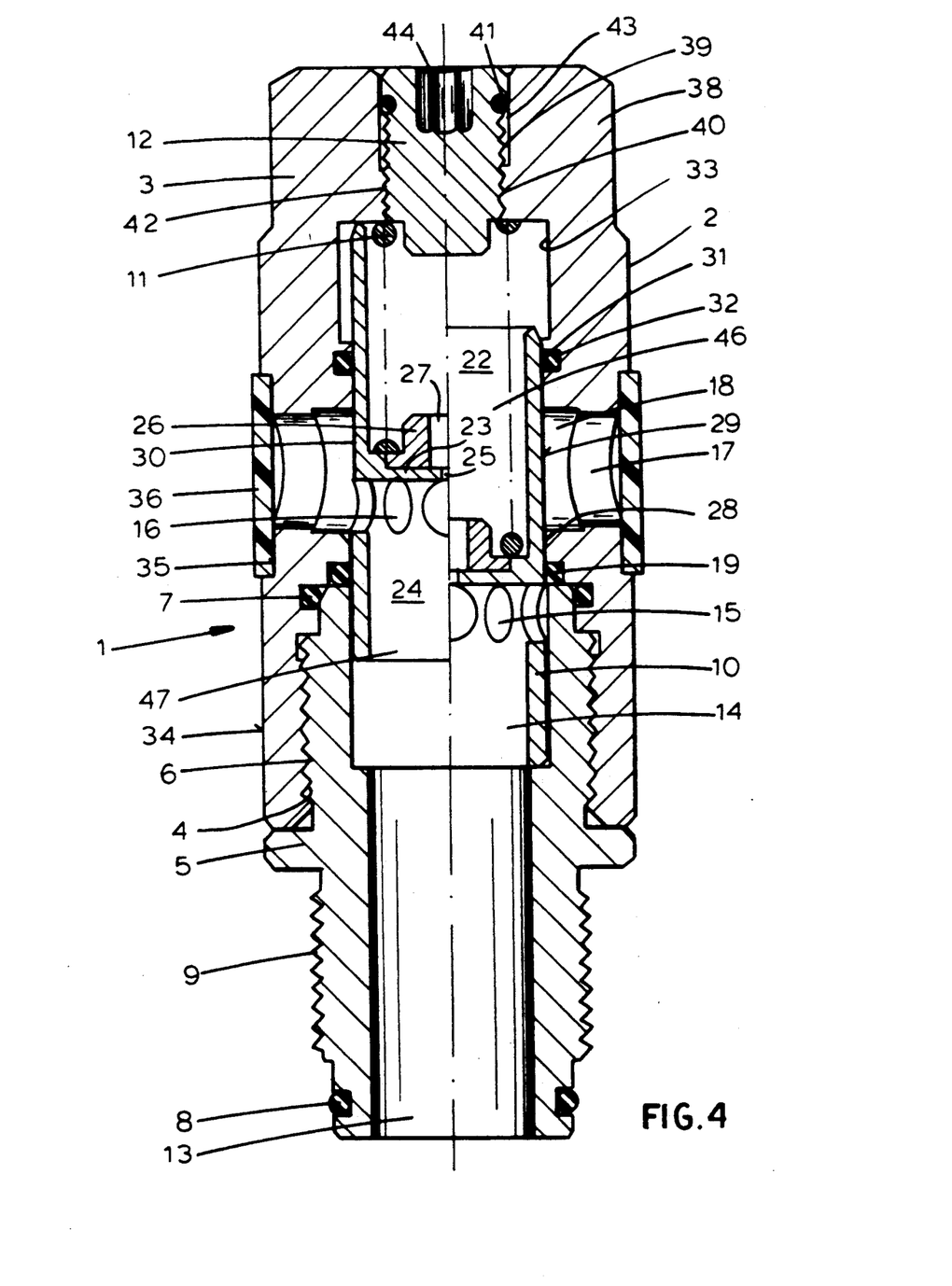
FIG. 4 is an axial cross-sectional view of a pressure-relief valve with simple valve piston and laterally closed cross bores.

Instead of the annular channels and the housing bore, according to FIG. 4 the connection between the two chambers 46, 47 and between the spring face 22 and the antechamber 24 is achieved by means of a throttle bore 25 which is provided in the partitioning wall 23 and which insures a connection between the spring space 22 and the antechamber 24 via the spring cap 26 with the bore 27. Through this throttle bore 25 here also the same pressure is established in the spring space 22 and the antechamber 24.

A displacement of the valve piston 10 under excessive load, i.e. under increasing pressure in the antechamber 24 is achieved due to the diameter reduction 30 in the area of the outer wall 29. In the illustrated example the rate between the diameter reduction in the lower and the upper portion equals 25 to 24.7 mm. Based on the difference in pressure surfaces of for instance 0.11 cm valve spring 11 with clearly advantageous characteristic curve, namely with a shallow slope, can be considered. This valve spring 11 with favorable characteristic curve has such reduced space requirements due to the selected wire strength and its overall dimensions, that it results in advantageous dimensions for the entire pressure-relief valve.

The sealing of the entire pressure-relief valve 1 with respect to the outside is achieved by means of the sealing ring 36 fitted into the annular groove 35, this sealing ring covering completely the cross bores 17, whereby the annular groove 35 is so deeply recessed into the outer wall 34 that the sealing ring 36 projects only slightly over the outer wall 34. This sealing system can also be applied to the embodiments shown in FIGS. 1 to 3.

In the upper portion 38 an inner bore 39 of smaller diameter is provided, which has a thread 40. The adjusting screw 12 can be displaced without any problem so that the spring force of the valve spring 11 can be set in accordance with the circumstances. The O-ring 41 provides an effective seal, whereby the O-ring can also be displaced over the sealing path 43 until it stops in front of the segment 42. In the embodiments shown in FIGS. 3 and 4 of the pressure-relief valve 1 the closing values are less advantageous then in the embodiments according to FIG. 2, and especially according to FIG. 1. Also considered from the point of view of other dimensions and application possibilities, the embodiment shown in FIG. 1 represents the optimal embodiment.

I claim:

1. Pressure-relief valve for the protection of hydraulic units, particularly of hydraulic face support systems in underground mining and tunnel construction against sudden overload due to rock pressure or similar causes, with a valve piston defined by an outer surface arranged to slide in a valve housing against the force of a valve spring and with an inlet opening at a first end of the valve piston provided with a blind bore therethrough and with radial bores that pierce the piston outer surface and with cross bores provided on an inner wall of the valve housing communicable with the radial bores, whereby the valve piston is sealed by an annular ring overridden by the radial bores, wherein the valve piston is formed as a continuous tubular shell with an attachment at a second and remote from the first end serving as control piston having a reduced outer diameter relative to an outer diameter of the tubular shell and with sealing rings lodged in the inner wall of the valve housing both above and below openings defining the cross bores, whereby two separate chambers are defined inside and above the valve piston both subjected to the same pressure and the control piston rests against a spring cap loaded by the force of the valve spring.

2. The pressure-relief valve according to claim 1, wherein the control piston is arranged centrally and upwardly intersects a cover of said valve piston and passage openings are arranged in a core around a circle with the passage openings capable of communicating with said chambers.

3. The pressure-relief valve according to claim 1 wherein the control piston has at least one radial bore and has an annular groove along an outer wall forming the control piston in an area below the at least one radial bores of the control piston.

4. The pressure-relief valve according to claim 1 wherein characterized in that the cross bores 17 run outwardly inclined starting from an annular channel 18.

5. Pressure-relief valve according to claim 1 wherein the valve piston has an outer diameter of 25 mm and the control piston has an outer diameter of 10 mm.

6. The pressure-relief valve according to claim 1 wherein the valve piston is equipped with 12 radial bores each having a diameter of 5 mm.

7. The pressure-relief valve according to claim 1 wherein the sealing rings are made of Teflon TEM 1600 and have a rectangular cross section.

8. The pressure-relief valve according to claim 1 wherein the sealing rings are arranged in annular grooves and are secured via a mechanism selected from the group consisting of a plug-in socket and a guide screw which mechanism at the same time serves at a partition.

* * * * *